United States Patent
Ocheltree et al.

(10) Patent No.: US 6,561,845 B2
(45) Date of Patent: May 13, 2003

(54) DISTRIBUTED CONNECTOR SYSTEM FOR WEARABLE COMPUTERS

(75) Inventors: Kenneth B. Ocheltree, Ossining, NY (US); Ronald A. Smith, Wake Forest, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/749,162

(22) Filed: Dec. 27, 2000

(65) Prior Publication Data

US 2002/0081895 A1 Jun. 27, 2002

(51) Int. Cl.[7] .............................................. H01R 13/60
(52) U.S. Cl. ................................................... 439/540.1
(58) Field of Search .............................. 439/540.1, 37, 439/498, 502, 623, 638, 639

(56) References Cited

U.S. PATENT DOCUMENTS

| | | | | |
|---|---|---|---|---|
| 5,305,244 A | * | 4/1994 | Newman et al. | 364/708.1 |
| 5,411,416 A | * | 5/1995 | Balon et al. | 439/639 |
| 5,581,492 A | * | 12/1996 | Janik | 364/708.1 |
| 5,807,140 A | * | 9/1998 | Hopkins | 439/638 |
| 5,914,585 A | * | 6/1999 | Grabon | 320/125 |
| 6,024,607 A | * | 2/2000 | Wahl | 439/639 |
| 6,097,607 A | * | 4/2000 | Carroll et al. | 361/752 |
| 6,137,675 A | * | 10/2000 | Perkins | 361/679 |
| 6,324,053 B1 | * | 11/2001 | Kamijo | 361/683 |

* cited by examiner

Primary Examiner—Gary Paumen
Assistant Examiner—Ann McCamey
(74) Attorney, Agent, or Firm—Ference & Associates

(57) ABSTRACT

A harness system and connector system for a computer, such as a portable or wearable computer. The connector system includes a docking connector which interfaces with a system unit, a plurality of leads in communication with the docking connector and a plurality of connecting elements associated with the plurality of leads, the connecting elements each being adapted to interface with at least one external component.

2 Claims, 4 Drawing Sheets

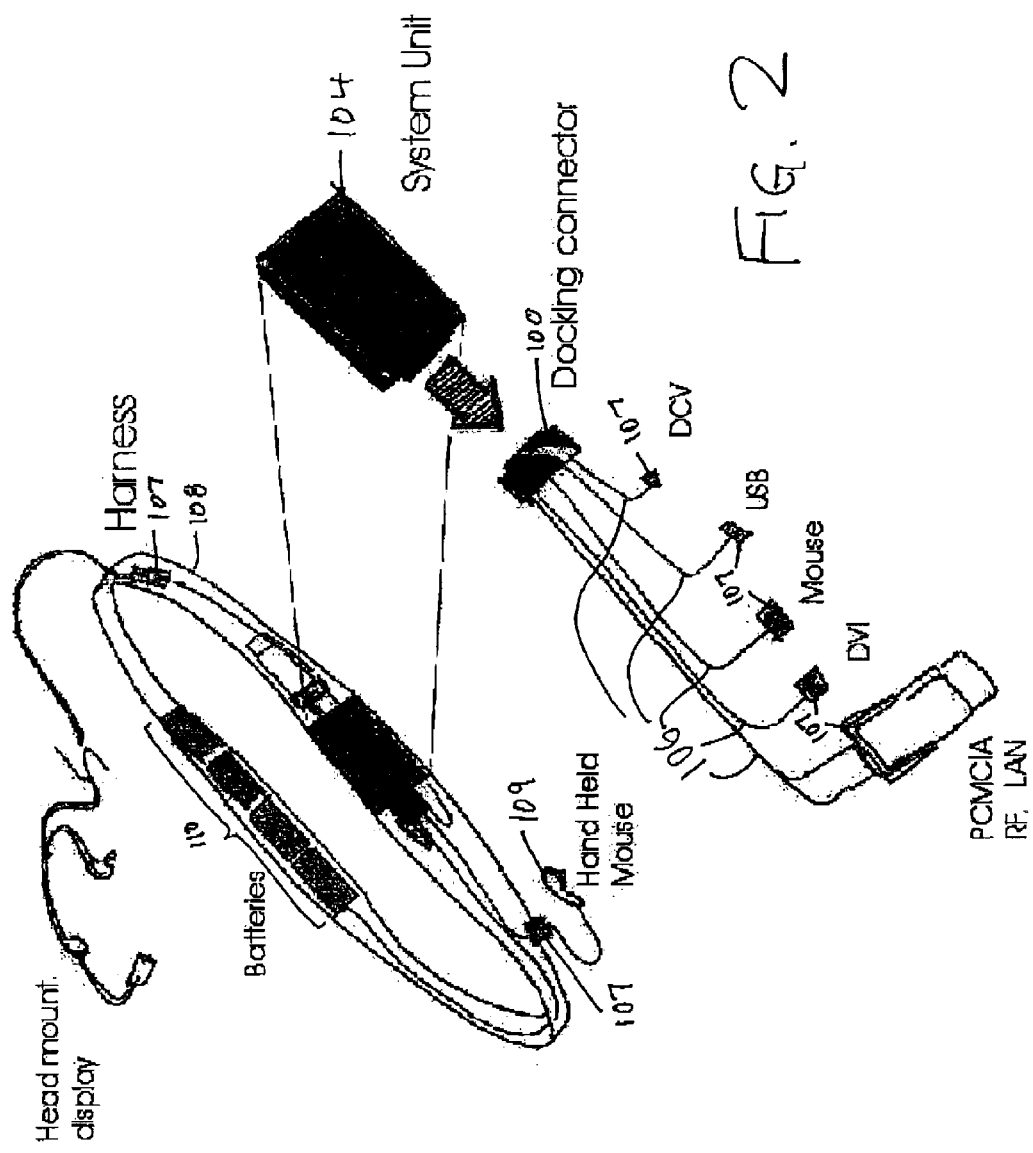

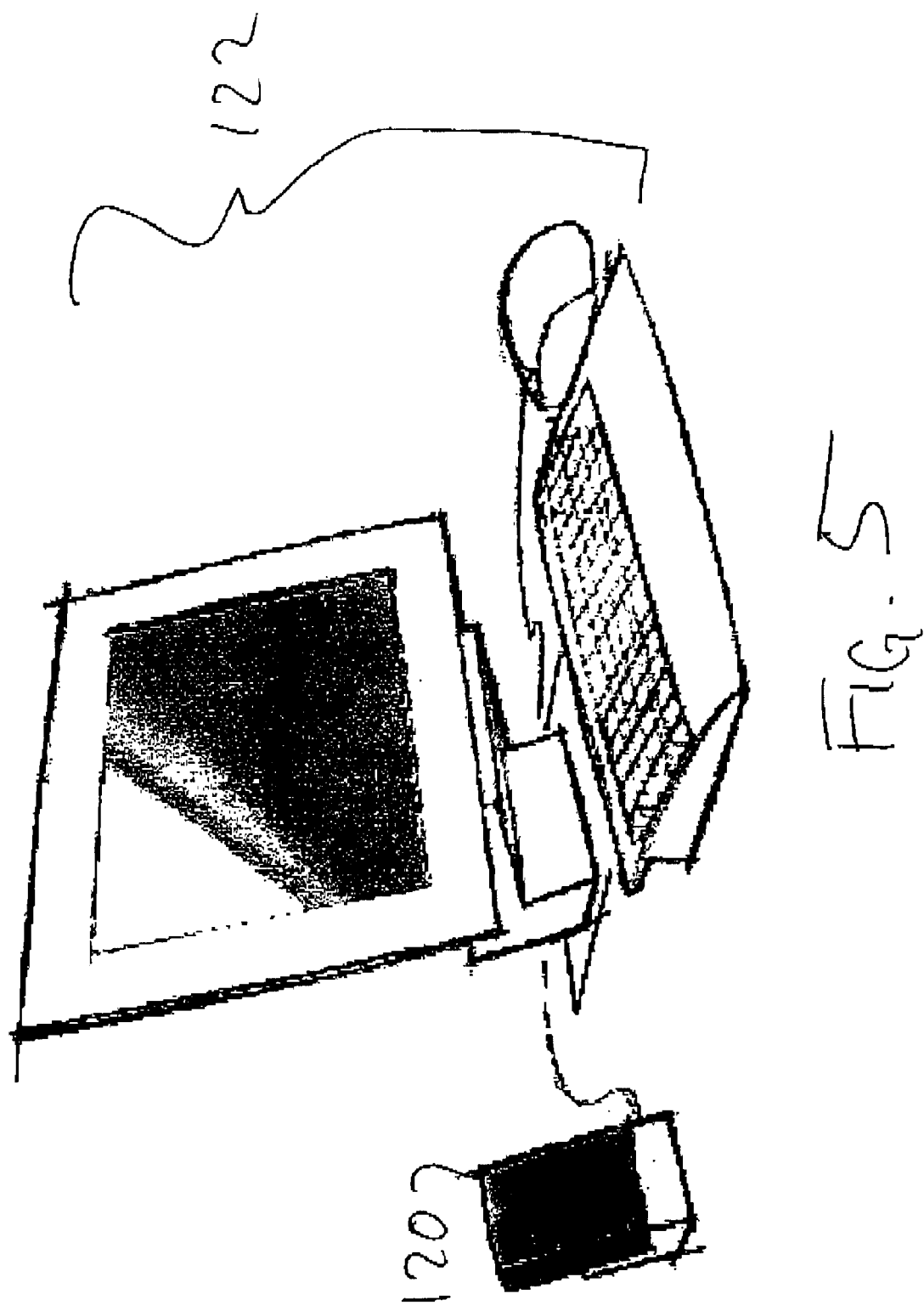

DISTRIBUTED CONNECTOR SYSTEM FOR WEARABLE COMPUTERS

FIELD OF THE INVENTION

The present invention relates generally to wearable computers and, more specifically, to methods and arrangements for facilitating the connection of auxiliary components therewith.

BACKGROUND OF THE INVENTION

As miniaturization of computer products continues, the problem of adequate space for connections of input and output devices (I/O) continues to grow. The minimum size of many computer products are now being defined by the number and type of connectors used, especially on the highly integrated devices of the type used in wearable computer technology. In other words, since it is the case that a minimum amount of space must typically be allocated for accommodating connectors or connecting interfaces in the environment of a wearable computer, it has been found that further efforts towards miniaturization in the context of wearable computers has been hampered.

A need has thus been recognized in connection with facilitating further miniaturization in the context of wearable computers by reducing the amount of space associated with connectors, connection interfaces or other connecting elements.

SUMMARY OF THE INVENTION

In accordance with at least one presently preferred embodiment of the present invention, a single docking-type connector is provided on a computer system unit, and distributes the I/O connectors required for a given task, into the harness (wearing device) of the computer. The docking connector preferably has enough pins to carry all of the I/O signals, power and grounds for the computer.

Successful wearable computers will offer flexible configurations of I/O and wearing possibilities. Because the system unit has all of the possible I/O signals, different types of harnesses (as variously illustrated by way of example in the drawings) allow for many configurations. The harnesses with the cabling are relatively inexpensive compared to the system unit.

Generally, in accordance with at least one presently preferred embodiment of the present invention, problems relating to the space taken up by connectors are solved by essentially exchanging the multiple connectors required for I/O on a system unit for a single docking connector. By redistributing the individual connectors into various harnesses and docking stations, the system unit is greatly reduced in size and can achieve. attendant advantages as discussed herein.

In one aspect, the present invention provides a connector system for a computer, the connector system comprising: a docking connector which interfaces with a system unit; a plurality of leads in communication with the docking connector; and a plurality of connecting elements associated with the plurality of leads, the connecting elements each being adapted to interface with at least one external component.

In another aspect, the present invention provides a harness system for supporting a portable computer, the harness system comprising: a harness which accommodates a system unit; a docking connector which interfaces with the system unit; a plurality of leads in communication with the docking connector; and a plurality of connecting elements associated with the plurality of leads, the connecting elements each being adapted to interface with at least one external component.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 2 illustrates a wearable computer system with distributed connectors.

FIG. 5 shows a miniature computer in conventional docking with a desk top computer.

DESCRIPTION OF THE PREFERRED EMBODIMENTS

Figure 1:
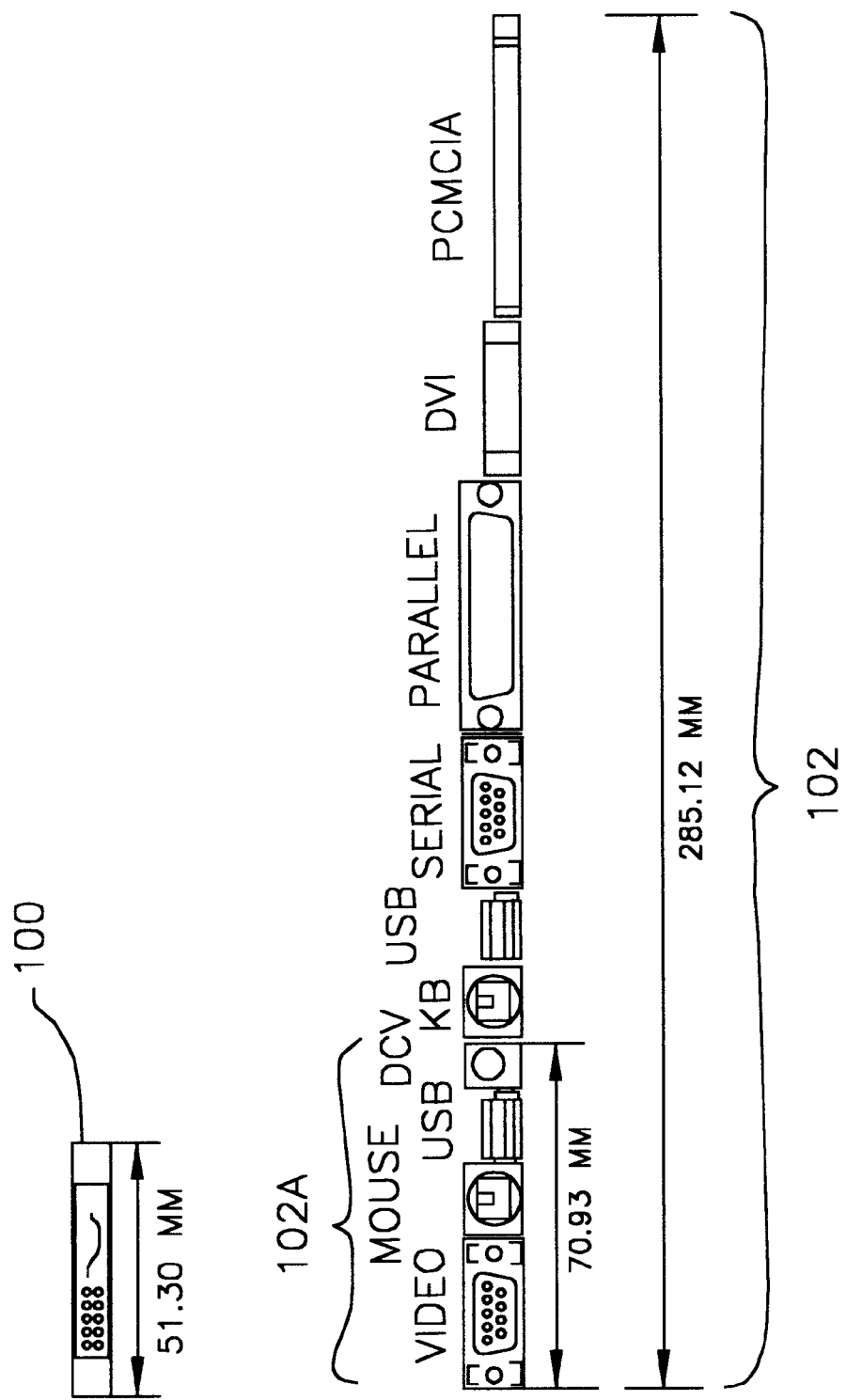
FIG. 1 provides a comparison of the respective space requirements for a docking connector in accordance with the present invention and a conventional set of connectors.

FIG. 1 provides a comparison of the respective space requirements for a docking connector 100 that may be employed in accordance with the present invention and a conventional set of connectors 102. As a non-restrictive, illustrative example, the docking connector 100 may be 160 pin. On the other hand, indicated at 102a is what may be regarded as a "bare minimum" set of conventional connectors for a wearable computer, including a video connector, a mouse connector, a Universal Serial Bus (USB) connector and DC/V (electrical power) connector. The balance of the illustrated connectors 102, on the other hand, represent what is additionally attainable in connection with the docking connector 100. (Among these, for example, are KB [keyboard], USB, a "Send" connector, a "Parallel" connector, a DVI [digital video interface] connector, and a PCMCA connector). Thus, it will be appreciated that a docking connector 100, in accordance with at least one embodiment of the present invention, will be able to serve essentially the same functions, in composite, as the multiple connectors 102. The savings in frontal area (i.e., the area corresponding to an opening in a computer cover) gained by removing the connectors from the system unit and distributing them to the harness are apparent from FIG. 1. For a typical wearable computer system unit, it has been found that the use of the totality of connectors 102 might represent about 77% of the area on the edge of the system unit (i.e., the normal place to put connectors extending from the edge of the card), while the figure for the minimum set of connectors 102a might be about 19.5% and, for the docking connector 100, 6.3%.

FIG. 2 shows how the distribution of various connectors may take place in a harness. As shown, a system unit 104 has a docking connector 100. Docking connector 100 may preferably be a detachable component that mates with the main body of the system unit 104 itself Preferably extending from docking connector 100 are a number of harness connectors 106 (for instance, PCMCIA/RF LAN, DVI, "Mouse", USB, DCV, etc . . . ). There is preferably a printed circuit board (PCB) with all of the harness connectors 106 wired in "pigtail" fashion. The harness leads 106 may preferably be laid out about the harness 108 in such a manner that the individual connecting elements 107 may be located at different points along the circumference of harness 108. As shown, a handheld mouse 109 may be connected with a corresponding connecting element 107. Harness 108 may also preferably accommodate batteries 110 as well as a head mount display 112 having a lead that is connected with one of the connecting elements 107.

It will be appreciated that the approach contemplated in connection with FIG. 1 will allow the system unit 104 to be easily removed with only one connection. A system unit 104 such as that shown in FIG. 1 may conceivably have a size of about 15×65×120 mm, which would represent a degree of miniaturization far greater than that previously attainable without a distributed connector system.

A preferred manner of "stepping down" the connection elements 107 into the connection leads 106 and then into the connector 100 may involve a one-to-one correspondence between each of the pins in each of the connecting elements 107 and each of the pins in connector 100. It should be understood, though, that it is conceivable to only use some of the connections so that some of the pins in connector 100 are not actually used.

Accordingly, FIG. 6 illustrates several connecting elements 107 in communication with docking connector 100 via several leads 106. Each of the connecting elements has a set of pins 107*p* while docking connector has a set of pins 100*p*.

Figure 3:
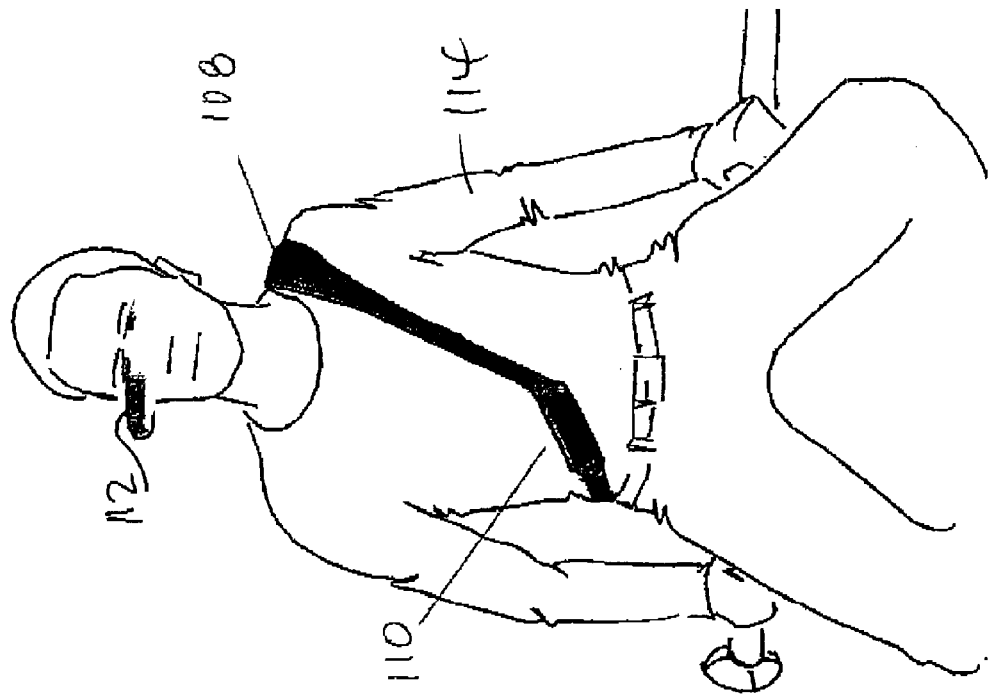
FIG. 3 shows an individual wearing the wearable computer system of FIG. 2.

FIG. 3 shows an individual 114 wearing the wearable computer system of FIG. 2.

Figure 4:
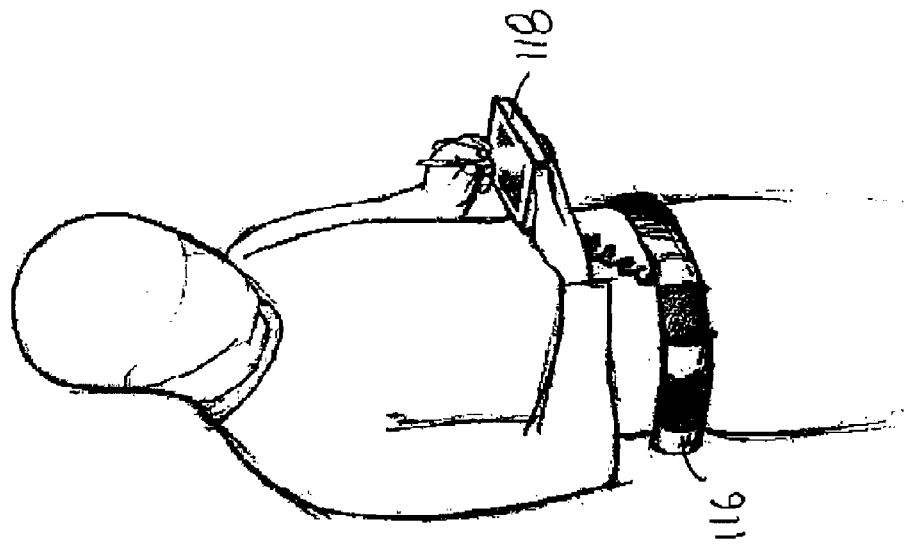
FIG. 4 shows an individual wearing a belt-type harness with a computer having a direct view screen.

FIG. 4 shows an individual wearing a belt-type harness 116 with a computer having a direct view screen 118. It will be appreciated that such a configuration is attainable in conjunction with a distributed connector system in accordance with at least one embodiment of the present invention.

FIG. 5 shows a miniature computer 120 in conventional docking with a desk top computer 122. It will be appreciated that such a configuration is also attainable in conjunction with a distributed connector system in accordance with at least one embodiment of the present invention. In this case, the miniature computer 120 could subsequently form part of a wearable computer system, or it could be used in other contexts where it is not necessarily "worn" by an individual.

It will be appreciated that the approach contemplated herein provides several advantages. For one, the docking connector will almost certainly be smaller in both volume and area than the combination of the minimum number of connectors required, making the computing system unit as small as possible. Secondly, because all of the I/O possibilities are accounted for in the docking connector and the custom harness, it allows for a modular system of computer and harness and the designer can avoid compromises of leaving off connectors of the system unit because of limited space. Preferably, the harness will be customized for the task. Thus, not only will all of the right connections be available for the I/O, but only the ones required will be used, thereby saving weight, which is widely recognized as being an important characteristic for all wearable devices.

Another advantage enjoyed in connection with at least one presently preferred embodiment of the present invention is that wearable computers, in general, may sometimes be used in harsh environments (often outside or in industrial settings) and need to be rugged and, quite often, resistant to dust and water. By reducing the I/O connections to the one docking connector on the system unit, the integrity and durability of the system is facilitated since the number and size of openings in the system covers will be limited; the unit will be stronger and easier to seal.

Finally, as far as wearablilty and the management of cables is concerned, having only one connector on the system unit allows the designer to manage the cables coming from the unit into the harness and avoid a "rats nest" of cabling coming off the unit in less than ideal directions. In addition to saving the connector area and volume on the system unit, the inventive design serves to move the volume used by the cable end of the connector to areas away from the system unit, distributing that volume into the harness. By not having connectors exiting from many sides of the system, there is more flexibility for the manner in which the unit is mounted and worn on the user's body.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A harness system for supporting a portable computer, said harness system comprising:

a harness which accommodates a system unit;

said harness comprising a belt harness adapted to be worn by a human;

a detachable docking connector comprising a plurality of pins which enable said connector to interface with the system unit;

a plurality of leads in communication with said docking connector, said leads being of differing length;

a plurality of connecting elements, and each of said connecting elements being associated with a corresponding one of said leads, said connecting elements each being adapted to interface with at least one external component; and said leads each being distributed to run along at least a portion of the circumference of said belt harness such that said connecting elements are disposed at different points along the circumference of said belt harness.

2. The harness system according to claim 1, wherein said harness further comprises a shoulder harness.

\* \* \* \* \*